United States Patent [19]

Bates

[11] Patent Number: 4,487,666
[45] Date of Patent: Dec. 11, 1984

[54] ELECTROLYTICALLY FORMING A LOT OF VALVE-METAL-BODIES FOR USE IN CAPACITORS

[75] Inventor: James S. Bates, East Lebanon, Me.

[73] Assignee: Sprague Electric Company, North Adams, Mass.

[21] Appl. No.: 595,207

[22] Filed: Mar. 30, 1984

[51] Int. Cl.³ .................. C25D 11/02; C25D 11/34
[52] U.S. Cl. .................... 204/56 R; 204/56 M; 204/58
[58] Field of Search .............. 204/56 R, 56 M, 58

[56] References Cited

U.S. PATENT DOCUMENTS

| | | | |
|---|---|---|---|
| 3,843,492 | 10/1974 | Bernard | 204/25 |
| 3,956,081 | 5/1976 | Holtje | 204/56 R |
| 3,988,215 | 10/1976 | Scherr | 204/28 |
| 4,052,273 | 10/1977 | Aronson et al. | 204/37 |

Primary Examiner—R. L. Andrews

[57] ABSTRACT

A lot of tantalum pellets is submersed in a tank of liquid electrolyte and electrolytically formed to make anodes for use in electrolytic capacitors. During formation, periodic in situ measurements of capacitance are made to gain insight into the formation characteristics of the lot of pellets in hand. Progressively better estimates are made of how much total accumulated formation charge will be necessary to reach the desired capacitance. The method is accurate and fast.

19 Claims, 7 Drawing Figures

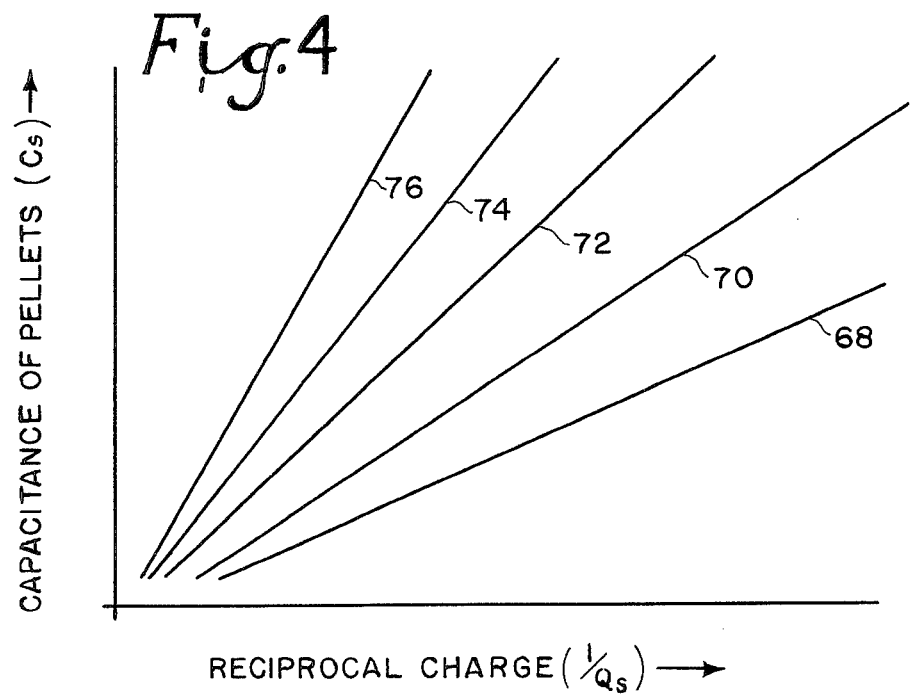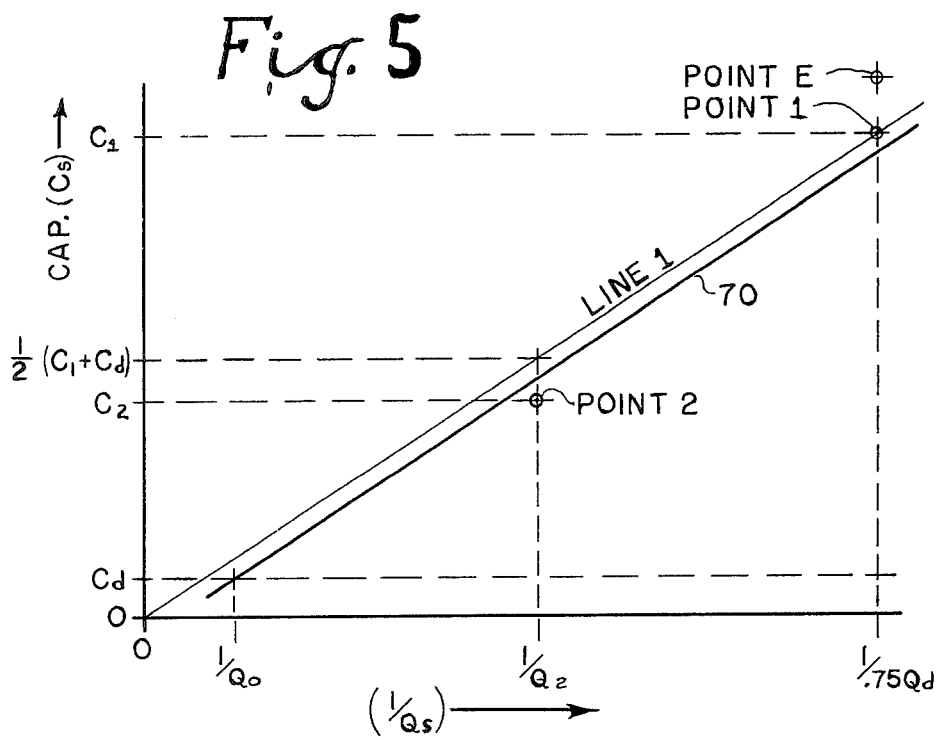

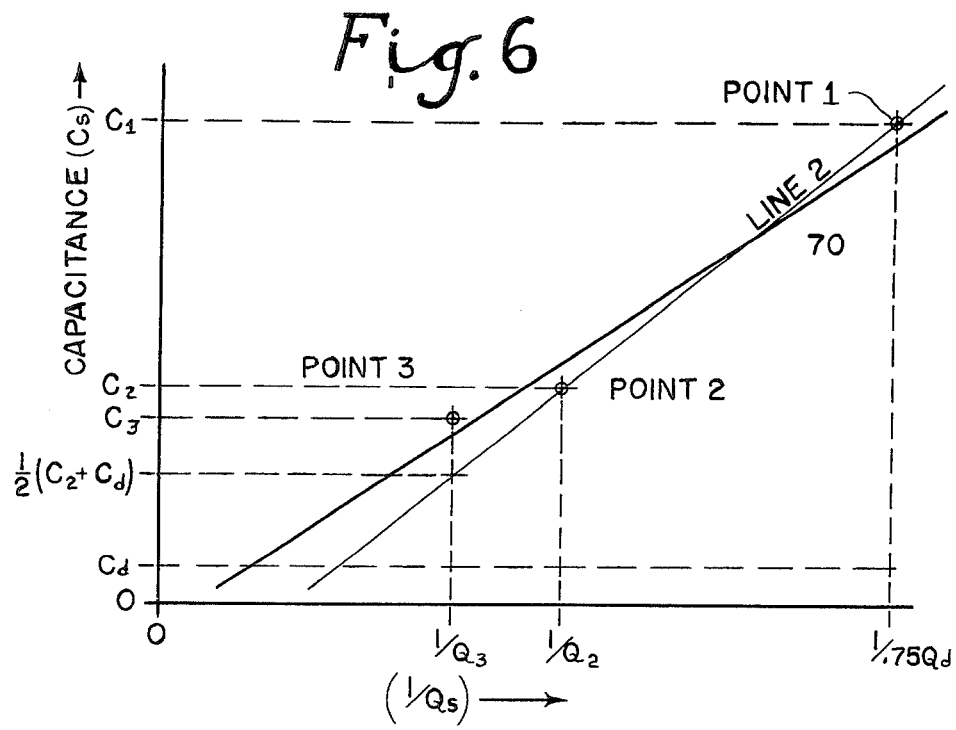
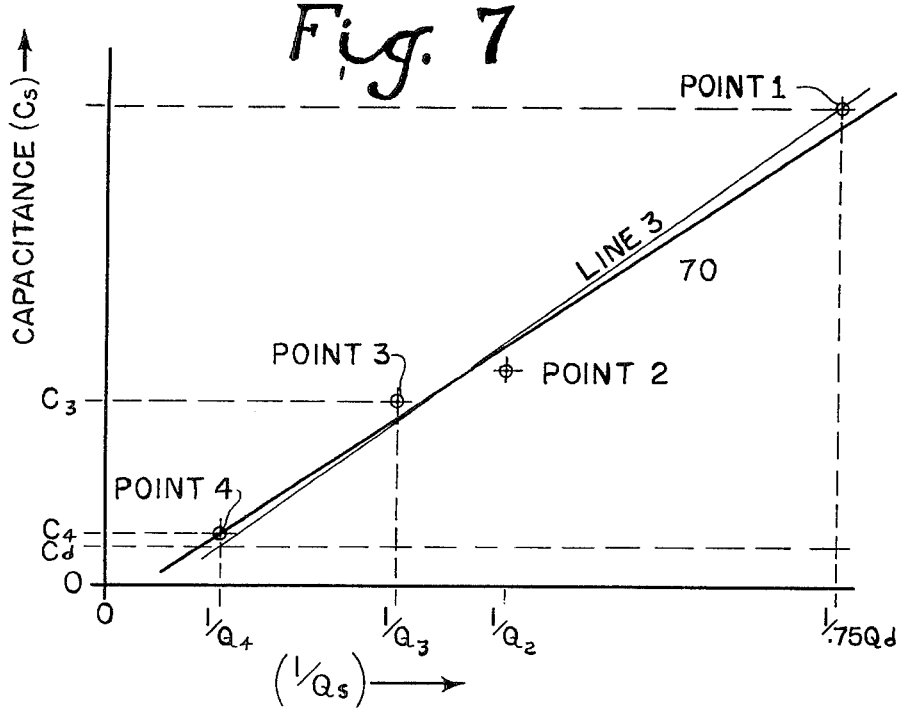

ELECTROLYTICALLY FORMING A LOT OF VALVE-METAL-BODIES FOR USE IN CAPACITORS

BACKGROUND OF THE INVENTION

This invention relates to a method for forming a plurality of valve metal capacitor bodies; that is, forming on the surfaces of the valve metal bodies, a thin film of valve-metal oxide that will serve as the capacitor dielectric in an electrolytic capacitor.

The valve metals most often used in electrolylic capacitors are tantalum and aluminum. Others such as titanium or the alloys of the above have not yet been of much commercial interest.

For making solid electrolyte capacitors, batch methods are used to start the process. For example, porous tantalum pellets each having a tantalum lead wire extending from one end are suspended by their lead wires in a liquid electrolyte. Typically, pellets are made by compacting tantalum powder in a mold with a tantalum wire partially buried therein and sintering to fuse the adjacent surfaces of wire and particles to each other. A cathode conductor is also submerged in the electrolyte. The tantalum oxide dielectric film is formed over the surfaces of the pellet by connecting an electric power supply between the cathode and the pellets, the latter serving as anodes in their electrolytic cell. Formed pellets of this kind are also placed into individual containers filled with a liquid electrolyte to make "wet" electrolyte capacitors.

On the other hand solid electrolyte capacitors are made by repeatedly impregnating the formed pellets with a manganous nitrate solution, heating to pyrolize the nitrate and convert it to manganese dioxide, a solid electrolyte. A counter electrode of graphite and silver may be formed over the manganese dioxide.

In any case, it will be appreciated that a most critical part of the process will be formation of the dielectric valve metal oxide film. It has become increasingly important to make such capacitors to tighter capacitance limits with high yields to minimize the waste of materials and to meet the growing demands by electrolytic capacitor users for close tolerance capacitors.

Forming pellets to a close capacitance tolerance is made difficult by the fact that the pelleting steps of compacting and batch sintering even under the best possible conditions produces pellets having a wide range of pellet surface areas.

From lot to lot, such pellets exhibit capacitance values over a wide range. Thus, it is customary to characterize each lot of pellets electrically prior to formation so that "large surface area pellets" may be predictably formed to a lower voltage than "small surface area pellets" to make both exhibit more nearly the same capacitance values.

The pre-formation testing is often called "wet-checking" and is accomplished by submersing a sample of the pellets from a lot into the electrolyte of a test cell and forming them at a fixed voltage $V_p$ for a fixed time. The capacitance is then measured at 1KH. From the well known fact that the product of the formation voltage $V_p$ and capacitance $C_p$ is about constant, this data leads to the particular $C_p V_p$ product of this particular lot of pellets and the capacitance at any other formation voltage can be calculated to a first approximation. At wet checks the formation voltage $V_f$ that is associated with the desired capacitance $C_f$ is approximately determined by $$V_f = C_f \frac{V_p}{C_p}.$$

Even so, it is not possible to make the desired close tolerance capacitors directly from the wet check data alone. The above noted variations in pellets steming from pellet making variables as well as from the use of different batches of the start powder, leads to variations in the rate of formation from lot to lot of pellets. So, even when all the lots appear to have the same electrical characteristics prior to formation, there is still a substantial spread in their capacitance values after formation. Although very time consuming, this problem may be solved by periodically interrupting the formation, removing a sample number of pellets from the main formation tank and performing a wet check. Wet checks typically take from 5 to 20 minutes and are manpower intensive.

It is, therefore, an object of this invention to provide a faster more cost effective method for forming lots of valve metal capacitor bodies to tight capacitancevalue tolerances.

SUMMARY OF THE INVENTION

In one aspect of the invention the progress of formation of a lot of valve metal bodies is monitored for obtaining an increasingly accurate picture of the formation characteristics of that lot of bodies so that it is possible to make better and better estimates of how much total accumulated formation charge will be necessary to reach a targeted capacitance for the lot.

More specifically the method includes periodically measuring the capacitance of the bodies in the electrolyte and the accumulated formation charge to progressively more accurately define the characteristic formation properties of the particular lot of valve metal bodies being formed.

A continuous integration of the formation current yields a measure of the total accumulated formation charge at any instant. At each periodic measurement of capacitance the total accumulated charge is noted and this pair of data is added to others of the previous measurements to provide an enhanced view of the particular formation characteristic of the lot undergoing formation. After each of the capacitance measurements, there is predicted from what is thus far known of the characteristic formation properties a new accumulated charge that will produce a capacitance value nearer to the predetermined target value. Then the bodies are formed up to the predicted new charge before the next of the periodic capacitance measurements. The formation is terminated when the capacitance of the lot reaches the target value range or falls within an acceptable range, e.g. a desired capacitance plus and minus ten percent.

Preferably the formation current is continuously monitored and a measure of the accumulated formation charge is continuously generated. Each corresponding pair of measured capacitance and charge are preferably considered to define a point in a graph of the lot capacitance verses the reciprocal of the accumulated formation charge. Straight line fits to these points are therefore an approximation to the lot's characteristic formation properties, and each new line represents a better approximation in the vicinity of the target capacitance value. After the third line is so constructed, the lot may be safely charged directly to the value corresponding to the exact value of desired lot capacitance with a very high level of confidence that the subsequently measured lot capacitance will lie within 3 percent of that desired value.

The formation method of this invention depends for its efficiencies and savings in formation costs, upon the discovery that the characteristic formation "curve" of capacitance verses the reciprocal of the total accumulated formation charge is almost exactly linear. Experience to date indicates that the characteristic curve of a lot of tantalum pellets will have a correlation coefficient of linearity greater than 0.999 (from 8 to 95 volts).

The method of this invention depends further for efficiency and cost savings upon unique steps for interrupting the formation current, and without removing the pellets from the formation electrolyte performing an in situ measurement of the capacitance.

BRIEF DESCRIPTION OF THE DRAWINGS

FIG. 4 shows in a graph of capacity of a lot of pellets undergoing formation as a function of the accumulated formation charge (1/Q) for a variety of pellet lots representing respectively, lots with different pellet sizes, start powder types and other factors relating to pellet manufacture.

FIG. 5 shows in another graph of C vs. 1/Q the characteristic curve 70, chosen from among those shown in FIG. 4, and in addition the graphical construction of a first straight line approximation of that curve 70.

FIG. 6 shows said curve 70 and a second straight line approximation of curve 70 generated by a first in situ test of all the pellets of the lot at an intermediate point in their formation.

FIG. 7 shows said curve 70 and a third straight line approximation of curve 70 generated by a second in situ test of all the pellets of the lot at a later point in their formation.

The graphs in FIGS. 4,5,6 and 7 consistently exaggerate the deviations of measured capacitance values from the characteristic formation curve 70 so that these graphs very clearly illustrate the method of formation controll described hereinafter. In actual practice, points 1,2,3 and 4 fall almost imperceptably close to the curve 70 and point 4 is usually well within 3% of the desired capacitance value $C_d$.

DESCRIPTION OF THE PREFERRED EMBODIMENTS

Figure 1:
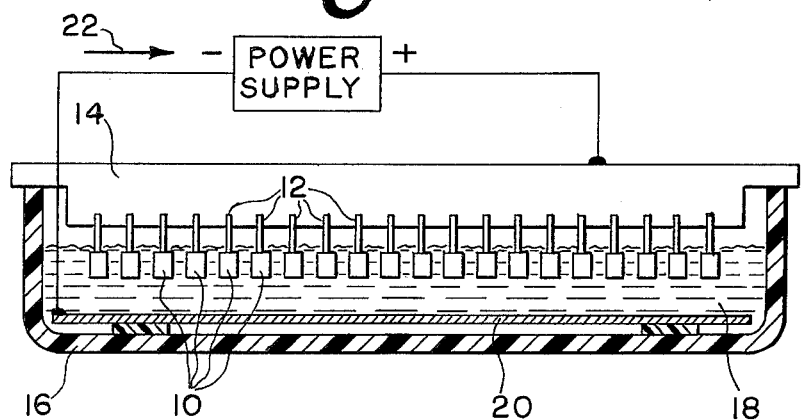
FIG. 1 shows a side sectional view of a formation tank with a string of tantalum pellets submersed in the formation electrolyte.

Referring to FIG. 1 a plurality of porous tantalum pellets 10 have their tantalum lead wires 12 welded to a metal carrier bar 14. The bar 14 is designed to be supported by the rim of a forming tank 16 that contains a liquid electrolyte 18 so that the pellets are submersed in the electrolyte 18. A metal sheet, screen or the like 20 lies at the bottom of the tank 16 in the electrolyte to 18.

An electrical power supply is connected between the sheet 20 serving as a cathode and the pellets 10 serving together as anode in this large electrolytic cell. Forming current 22 is caused to flow through the electrolyte 18 from pellets 10 to cathode sheet 20.

Figure 2:
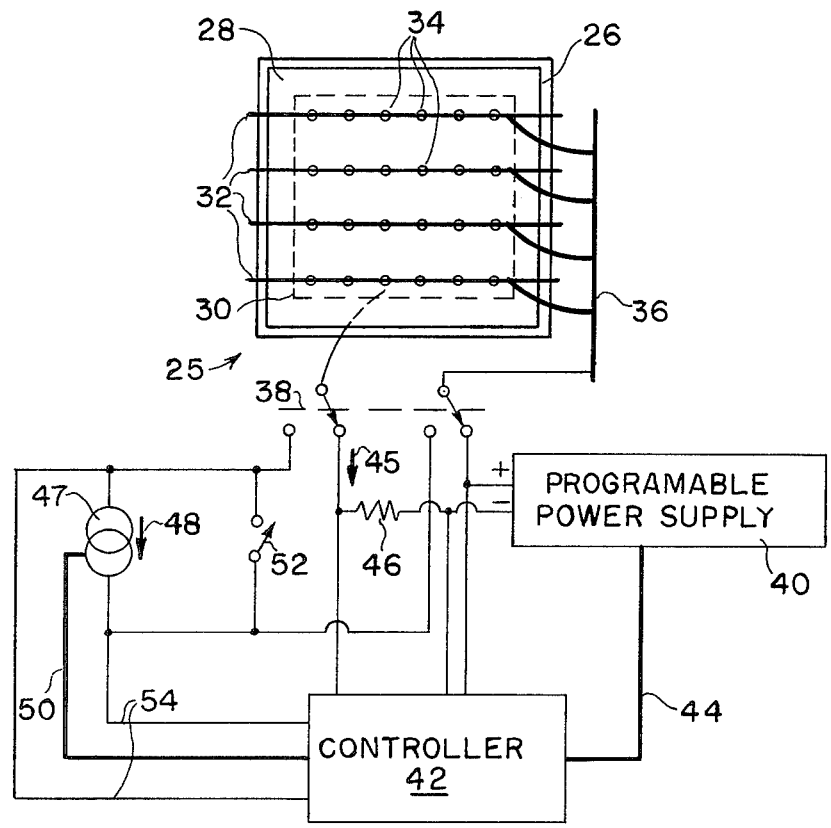
FIG. 2 shows a diagram of a pellet formation tank from a top view and the electrical circuitry mostly in block form for the formation method of this invention.

An electrolytic cell 25 is shown in top view in FIG. 2. A tank 26 contains a liquid electrolyte 28 and has a sheet cathode 30. Metal carrying bars 32 carry a plurality of pellets 34 that are suspended in the electrolyte 28. The carrying bars 32 are electrically connected to a bus bar 36.

The poles of a double-pole double-throw switch 38 are connected to the cathode 30 and anodes bus 36, respectively. For the switch 38 position shown in FIG. 2, the output of a standard remotely controlled power supply 40 is connected to the cell in the polarity for forming the pellets 34.

A small computer or controller 42 provides the signals via cable 44 to control the power supply 40. A measure of the amplitude of the formation current 45 is the voltage drop across a small-ohmic-value resister 46. The voltage drop is fed to the controller 42. The controller 42 also senses the formation voltage, $V_f$, at the output of the power supply 40. By this means, the power supply is made to perform as either a source of constant formation current or a source of constant formation voltage or changing from one to the other during a formation program. A remotely controlled high impedance source of current 47 is connected to anodes 34 and cathode 30 when switch 38 is thrown to the left in FIG. 2, and controller 42 may control the output current 48 from this source 47 via cable 50. Also with switch 38 thrown to the left, the electrolytic formation cell 25 may be shorted and discharged by closing switch 52. By wires 54 the controller 42 may sense the value of voltage across the current source 48 as well as across cell 25 when the switch 38 is thrown left and switch 52 is open.

This system is capable of interrupting the formation and measuring the capacitance value of all the anodes 34 taken together without removing them from tank 26. This interruption and capacitance measurement typically takes less than 20 seconds. It is performed as follows.

Switch 38 is placed in the right position as seen in FIG. 2 and the formation power supply 40 is provided the energy through current 45 to form the pellets 34.

It will be assumed for this discussion that the power supply is controlled to produce a constant current 45, which is preferred in the method of this invention as will be explained later below. However, from the point of view of the capacitance measurements it is immaterial what the character of the power supply output is.

Figure 3:
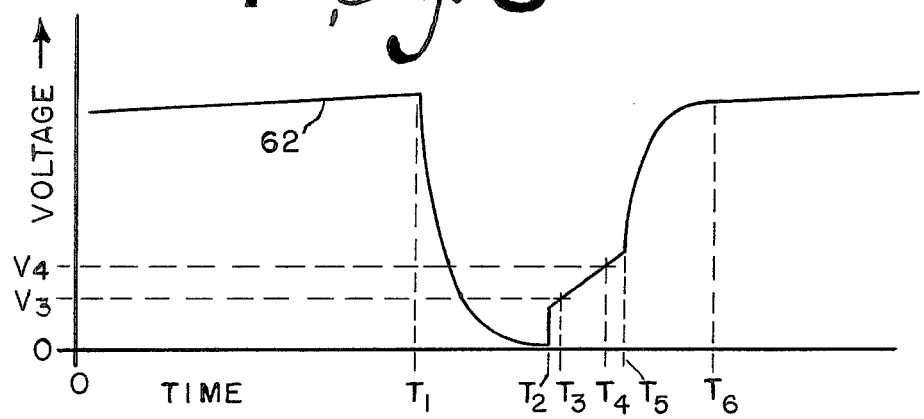
FIG. 3 shows a plot of voltage as a function of time during an interval that formation is interrupted to determine the pellets capacitance value, according to measuring steps of this invention.

During formation using a constant current (45), the formation voltage across the cell 25 rises gradually as the tantalum oxide film grows in thickness. This is evident in the plot, curve 62, of cell voltage as a function of time of FIG. 3 from time zero to $T_1$ and from $T_6$ upward.

The interruption of the formation current 45 occurs at $T_1$ when switch 38 is toggled left. Switch 52 is closed and the charge on the cell capacitor completely discharges by the time $T_2$. At $T_2$ switch 52 is open and the current from constant current source 48 begins to flow. During the current ramping, the change in voltage $\Delta V = (V_4 - V_3)$ is measured for a period of time $\Delta T = (T_4 - T_3)$.

From the familiar equation for an electrified capacitor $$I = C \frac{dv}{dt}.$$

In this special case of a capacitor being charged by a constant current $$I = C \frac{\Delta V}{\Delta T}$$

and $$C = I / \frac{\Delta V}{\Delta T}.$$

Now the controller determines the values I and $\Delta T$, measures $\Delta V$. The value of C is then computed.

The little sharp rise in cell voltage at time $T_2$ is the voltage drop caused by the constant current I through the electrolyte.

At $T_5$ switch 38 is toggled right again and after recharging cell 25 at time $T_6$, formation resumes.

Other in situ methods of measuring the capacitance of the cell may be used, such as applying a 1 KH3 sinusoidal voltage and measuring the resulting current flow from which the impedance and capacitance may then be calculated. However, the constant current method described above is greatly preferred for its potentially high speed, ready separation of ohmic voltage drops from the measurement of capacity and requirement for relatively simple apparatus to implement the measurement.

Referring again to the apparatus illustrated in FIG. 2, the switches 38 and 52 may be replaced by electromechanical relays, or solid state switches under the control of the controller 42. These switches may in fact be considered part of the controller.

Now that apparatus for forming and intermittantly measuring valve metal bodies has been described, a preferred method of this invention by which porous tantalum pellets may be formed to a desired capacitance value within a tight tolerance is as follows.

I have chosen to characterize valve metal bodies according to how their capacitance C varies as a function of the amount of charge that has been delivered during formation. The total accumulated formation charge at any time T is simply $$Q = \int_0^T I \, dt$$

where I is the formation current as a function of time. Where a formation is interrupted for a measurement of capacitance as noted above, the amount of charge contributed by the constant current used in the measurement, and the recharge current (from $T_5$ to $T_6$ in FIG. 3) do not contribute to formation thus to Q, furthermore even if included in Q, they are so small in practice as to be insignificant.

Tantalum pellets made from the same powder and having come through the steps of pellet manufacture together show only small differences from each other in their characteristic C vs 1/Q formation behavior. Lots of thousands and tens of thousands of tantalum pellets may be formed together in one tank. However, bodies of different sizes, sintering procedures or start materials produce a great variety of characteristic curves as are illustrated in FIG. 4 by curves 68, 70, 72, 74 and 76. Note that these curves do not pass through the origin but rather intercept the capacitance axis at a negative point if extrapolated.

A wet check is made on a sample number of bodies from a lot prior to beginning formation. From the wet-check-determined formation voltage $V_f$ necessary to provide the desired capacitance and from a knowledge of other factors relating to the particular valve metal of the bodies in the lot, the first estimated point E near the characteristic curve of the lot may be determined as follows.

It is assumed that the number of tantalum oxide molecules created in the formation of a pellet is proportional to the accumulated charge. It is further assumed that the tantalum oxide film has a thickness $$d = (20\text{Å}/V_f)$$

The film area $$A = \frac{\text{Film Volume}}{\text{Film Thickness}} = \frac{n}{d} K_1$$

where n is the number of $Ta_2O_5$ molecules in the film and $K_1$ is a constant and Q is the accumulated charge of formation; so that $$A = \frac{Q}{d} \frac{K_1}{K_2}.$$

By a well known relationship, the capacitance of each pellet is $$C' = KA/d$$

where K is the dielectric constant of tantalum oxide. Thus, $$C' = \frac{k}{d} \frac{Q}{d} \frac{K_1}{K_2}$$

or $$C' = K_3 \frac{Q}{d^2} = K_4 \frac{Q}{V_f^2}$$

Where $K_3$ is another constant. The sum of pellet capacitances of the lot of N pellets becomes $$C_s = NC' = K_4 \frac{Q}{V_f^2} \text{ and}$$

where $Q_s$ is the corresponding sum of the pellets accumulated charges, and assuming a straight line, line 1 in FIG. 5, this equation more generally becomes $$Q_s = \frac{NC'V^2 f}{K_4}.$$

Thus if one has a desired pellet capacity $C'_d$ in mind, then one can estimate the charge Q necessary to get there.

$$Q_d = \frac{N C_d' V_f^2}{K_4}$$

is the particular total accumulated charge for the whole lot, estimated here as needed to achieve the desired or target capacity, $NC'_d$ of the lot of pellets.

It was found from a large number and variety of experimental lots that were subjected to wet check and then formation, that the mean value of $K_4$ is 2777 volts within a tolerance of $\pm 20\%$, where $Q_d$ is in coulombs, $C'_d$ in microfarads and $V_f$ in volts.

The steps to follow are aimed at forming to a tolerance of much less than $\pm 20\%$.

The lot of pellets is formed to a fractional part of $Q_d$, i.e. from between 0.5 $Q_d$ and 0.95 which in part is taken as $Q_1$. Experience to date indicates that $Q_1$ may be as large as 0.85 $Q_d$ without risking overforming the pellets and irretrievably imbuing them with too great a capacitance. A higher factor would advantageously lead to faster convergence of this process and the desired lot capacitance $C_d$, but also increases the risk of overforming.

The formation is stopped when the accumulated formation charge, e.g. 0.85 $Q_d$, has been reached and the capacitance of the lot $C_s$ is measured and designated $C_1$.

Point E on line 1 in FIG. 5 was thus chosen as the goal of the first formation step. The measured capacity $C_1$ at the end of this first formation step reveals, the first point, point 1, that is on the characteristic curve 70 of this lot of pellets. Point 1 would be actually on line 1 except for inevitable errors in measurement. Point 1 in this example is at $C_1$ and $1/0.85\ Q_d$.

Now a new target charge $Q_2$ is chosen as one that would be predicted by line 1 to yield a capacitance $C_s$ that is intermediate $C_1$ and $C_d$. For example, $$C_s = \tfrac{1}{2}(C_1 + C_d).$$

This choice of halfway between $C_1$ and $C_d$ is not especially significant but is conveniently simple and leads to rapid convergence on the desired capacitance $C_d$. Of course there is a corresponding charge associated with this value of $C_s$ and so one may equally well choose a point on line 1 midway between $1/Q_o$ and $1/0.75\ Q_d$. Formation is recommenced and then stopped once again when the target total accumulated charge $Q_2$ is reached. The capacitance $C_s$ of the lot of pellets is measured and designated $C_2$. Thus another point on the characteristic curve 70 is revealed, namely point 2 at $C_2$ and $1/Q_2$. The construction is indicated in FIG. 5.

A straight line representation, line 2, of the characteristic curve 70 is drawn using the only two points (points 1 and 2) on curve 70 that are known. Another target charge $Q_3$ is chosen as one that would be predicted by line 2 to yield a capacitance $C_s$ that is intermediate $C_2$ and $C_d$, here chosen $C_s = \tfrac{1}{2}(C_2 + C_d)$. Formation is begun again and stopped where the target total accumulated charge $Q_3$ is reached. The capacitance $C_s$ of the lot of pellets is again measured and designated $C_3$. Thus a third point, point 3, is revealed as $C_3$ and $1/Q_3$. This construction is indicated in FIG. 6.

Yet another straight line representation, line 3, of the characteristic curve 70 is drawn using the three known points (1,2, and 3) on curve 70. The final target charge $Q_4$ is chosen as one that would be predicted by line 3 to yield the desired capacitance $C_d$. Formation is started again and stopped when the total accumulated charge $Q_4$ is reached. The final capacitance of the lot is measured and designated $C_4$. A fourth point on curve 70, point 4, is revealed at $C_4$ and $1/Q_4$. This construction is indicated in FIG. 7. Experience to date indicates that the capacitance $C_4$ (obtained at the fourth in situ capacitance measurement) is almost always within 3% of $C_d$.

Alternatively, the capacitance $C_4$ may be chosen as intermediate $C_3$ and $C_d$ to draw a line 4 (not shown). This procedure may be repeated as many times as is necessary to get within as close a tolerance band about the desired capacitance $C_d$ as one wishes.

The particular straight line approximations to the curve 70 used here, e.g. lines 1,2 and 3, are straight line fits to two or more known points by the well known technique of linear regression. This is best done by a dedicated computer.

Other techniques, or modifications of the linear regression technique used here, may be employed. For example each line may be fitted more closely to the most recently acquired points, perhaps accomplished by more heavily weighting the later points in a linear regression fitting. Convergence may also be accomplished more quickly by choosing "intermediate capacitance value" (between the last measured capacitance and the desired capacitance) at a factor that is progressively greater than $\tfrac{1}{2}$ the difference toward the desired $C_d$ as each new target $Q_s$ is determined. However, for making $\pm 10\%$ parts the rate of convergence is not a very large issue as was indicated above.

There are two kinds of problems that can cause the capacitance measurements to be in error, i.e. much higher or lower than they would be expected to be according to expectations deriving from the wet check data and later from the straight line approximations of the characteristic curve of the lot of pellets being formed. The electrolyte may evaporate and recondense on the carrying bar and pellet wires, tending to short out the pellets. Evaporation can also reduce the level of the electrolyte below the top of the pellets. Should either of these events occur, the above described formation process should be interrupted until the problem is resolved. To this end, the computer can be provided the capability of recognizing abnormally low capacitance readings, stopping further formation and sounding an alarm to notify an operator that this kind of problem exists and needs a correction before the controlled formation of this invention proceeds.

The primary advantage of this invention is the accuracy achieved in forming to a desired capacitance. However, of significance also is the greater speed of formation that is possible. For example a conventional formation time of 5 hours was reduced to 1 hour using the method of this invention. In another experiment formation time was reduced from $2\tfrac{1}{2}$ hours to 15 minutes. Heretofore the desired value of capacitance was approached using a voltage source set at a previously estimated final formation voltage. It was impossible using that approach to speed up the formation.

In the process of this invention a current source continuously held at the highest current level that will not overheat and damage the pellets, may power formation from start to finish thereby achieving a great increase in the speed of formation.

What is claimed is:

1. A method for electrolytically forming a lot of valve-metal-bodies for use in capacitors comprising:

establishing a formation current between a cathode and a lot of valve-metal-bodies that are submersed in a liquid electrolyte;

monitoring said current and periodically measuring the capacitance of said bodies in said electrolyte to progressively more accurately define the characteristic formation properties of said lot; and periodically, after each said capacitance measurement, predicting from what is thus far known of said characteristic formation properties an accumulated charge that will produce a capacitance value nearer to a predetermined target value, and continuing to form said bodies to said predicted charge before the next of said periodic capacitance measurements.

stopping said formation current and removing said bodies from said electrolyte when said capacitance from said measuring falls within a predetermined range of capacitance values.

2. The method of claim 1 wherein said formation current is momentarily interrupted during said periodic measuring of said capacitance values.

3. The method of claim 2 additionally comprising calculating from said monitored current the accumulated formation charge according to $$Q = \int_0^T I\, dt.$$

4. The method of claim 3 wherein each said measuring of the capacitance is accomplished by placing a momentary short between said cathodes and said bodies, subsequently introducing a constant current, $I_t$, therebetween and simultaneously measuring the rate of voltage $\Delta V/\Delta t$ increase with time, and calculating the capacitance according to $$C = \frac{I_t}{\Delta V/\Delta t}.$$

5. The method of claim 3 additionally comprising recording each of said measured capacitance values C and the corresponding accumulated charge Q and after each said measuring, generating a straight line fit to all the C and Q pairs thus far recorded in a field of capacitance as a function of the reciprocal of formation charge, and from each of said lines estimating a total accumulated charge that will be necessary to more nearly complete the formation of said lot to within said predetermined range of capacitance values.

6. A bulk method for electrolytically forming a production lot of valve-metal bodies for use as anodes in electrolytic capacitors comprising:
   (a) holding a group of said bodies suspended and electrically connected together via conductive wires;
   (b) submersing said bodies in a liquid electrolyte;
   (c) connecting a source of electrical energy between said bodies and a cathode inserted in said electrolyte to cause a current flow therebetween and to form a valve-metal oxide film over the surfaces of said bodies;
   (d) continuously measuring the accumulated charge transported by said current;
   (e) estimating the total charge $Q_d$, transported by said current that would be required to form said bodies to a desired total capacitance, $C_d$;
   (f) forming said bodies to an accumulated charge $Q_1$ that is a major fraction K of charge $Q_d$ and measuring the resulting capacitance, $C_1$;
   (g) using the data $Q_1$ and $C_1$ together to crudely characterize the bodies' formation properties, calculating an accumulated charge $Q_2$ necessary to reduce the capacitance to a value intermediate $C_1$ and $C_d$;
   (h) forming said bodies to said accumulated charge $Q_2$ and measuring the resulting capacitance, $C_2$;
   (i) using the data $Q_2$ and $C_2$ which along with $C_1$ and $Q_1$ better characterize the bodies' formation properties, calculating and accumulated charge $Q_3$ necessary to reduce the capacitance to a value intermediate $C_2$ and $C_d$;
   (j) forming said bodies to said accumulated charge $Q_3$ and measuring the resulting capacitance, $C_3$;
   (k) repeating steps (i) and (j), except calculating and forming said bodies to new values of accumulated charge and intermediate capacitance, as many times as is needed for the measured value of said capacitance to equal said desired capacitance $C_d$ to within a predetermined small capacitance value; and
   (m) terminating said current flow to stop said forming when said equality of said measured and said desired capacitance values in step (k) is realized.

7. The method of claim 6 wherein said valve metal is tantalum, and said method additionally comprises employing a computer for said estimating, additionally comprising entering in said computer the number N of said held submerged bodies, the desired capacitance $C_d'$ contributed by each of said bodies wherein $C_d' = C_d/N$, and a predetermined voltage $V_f$ to which said bodies will be formed, said estimating being in accordance with the approximate formula.

$$Q_1 = \frac{N\, C_d'\, V_f^2}{2777\text{ volts}} K$$

wherein $V_f$ is in volts, $C_d'$ is in microfarads, $Q_1$ is in coulombs and K is a unitless number chosen from between 0.5 and 0.95.

8. The method of claim 7 additionally comprising, prior to said connecting said current source, submersing another and smaller group from said same lot of bodies in a test cell containing a liquid electrolyte and a cathode, forming said small group of bodies at a fixed voltage $V_P$ for a predetermined time, measuring the capacitance $C_p$, calculating a formation voltage $V_f$ that would be expected to correspond to the desired capacitance $C_f$, according to $$V_f = C_f \frac{V_p}{C_p},$$

and using said calculated value of $V_f$ in said estimating of $Q_1$.

9. The method of claim 6 wherein said current is a constant current of value chosen large enough to achieve a desired fast rate of forming and small enough that said pellets are not overheated to the point of damaging the valve-metal oxide film resulting from said forming.

10. The method of claim 6 wherein said intermediate values are each approximately half way between said measured capacitance and said desired capacitance $C_d$.

11. The method of claim 6 wherein said forming current is monitored by a computer, said computer effecting said measuring of said capacitance when said charges have just been accumulated and effecting said calculating of charges for forming said bodies to said intermediate capacitance values.

12. The method of claim 11 wherein said calculating $Q_2$ is accomplished by said computer whereby a sample linear regression line of capacitance C on the reciprocal of accumulated charge Q is determined using the two points 0,0 and $C_1$, $1/Q_1$, said computer determining the value of $Q_2$ at the point on said line corresponding to said capacitance value intermediate $C_1$ and $C_d$.

13. The method of claim 11 wherein said calculating $Q_3$ is accomplished by said computer whereby another sample linear regression line of capacitance C on the reciprocal of accumulated charge Q is determined using the two points $C_1$, $1/Q_1$ and $C_2$, $1/Q_2$; said computer determining the value of $Q_3$ at the point on said another line corresponding to the capacitance value intermediate $C_2$ and $C_d$.

14. The method of claim 11 wherein said calculating $Q_4$ is accomplished by said computer whereby yet another sample linear regression line of capacitance C on the reciprocal of accumulated charge Q is determined using the three points $C_1$, $1/Q_1$; $C_2$, $1/Q_2$; and $C_3$, $1/Q_3$; said computer determining the value of $Q_4$ at the point on said yet another line corresponding to the desired capacitance value $C_d$.

15. The method of claim 11 wherein said calculating $Q_4$ is accomplished by said computer whereby yet another sample linear regression line of capacitance C on the reciprocal of accumulated charge Q is determined using the three points $C_1$, $1/Q_1$; $C_2$, $1/Q_2$; and $C_3$, $1/Q_3$; said computer determining the value of $Q_4$ at the point on said yet another line corresponding the capacitance value intermediate $C_3$ and $C_d$.

16. A bulk method for electrolytically forming a production lot of valve-metal bodies for use as anodes in electrolytic capacitors comprising:

(a) holding a group of said bodies suspended and electrically connected together via conductive wires;
(b) submersing said bodies in a liquid electrolyte;
(c) connecting current source between said bodies and a cathode inserted in said electrolyte to cause a current to flow therebetween and to form a valve-metal oxide film over the surfaces of said bodies;
(d) continuously measuring the accumulated charge transported by said current;
(e) estimating the total charge $Q_d$, transported by said current that would be required to form said bodies to a desired total capacitance, $C_d$;
(f) forming said bodies to an accumulated charge $Q_1$ that is a major fraction K of charge $Q_d$ and measuring the resulting capacitance, $C_1$,
(g) using the data $Q_1$ and $C_1$ which together characterize the bodies' formation properties, calculating an accumulated charge $Q_2$ necessary to reduce the capacitance to a value intermediate $C_1$ and $C_d$;
(h) forming said bodies to said accumulated charge $Q_2$ and measuring the resulting capacitance, $C_2$;
(i) using the data $Q_2$ and $C_2$ along with $C_1$ and $Q_1$ to better characterize the bodies' formation properties, calculating an accumulated charge $Q_3$ necessary to reduce the capacitance to a value intermediate $C_2$ and $C_d$;
(j) forming said bodies to said accumulated charge $Q_3$ and measuring the resulting capacitance, $C_3$;
(k) using the data of $Q_3$ and $C_3$ along with $Q_1$, $C_1$, $Q_2$ and $C_2$ to even better characterize the bodies' formation properties, calculating the accumulated charge $Q_4$ necessary to reduce the capacitance to a value intermediate $C_3$ and $C_d$;
(m) forming said bodies to said accumulated charge $Q_4$ and terminating said current flow to complete said forming.

17. The methods of claim 16 wherein K is approximately 0.75.

18. The method of claim 16 wherein said current source is a constant current source.

19. The method of claim 16 wherein said bodies are porous tantalum pellets.

* * * * *